US009418710B1

(12) United States Patent
Choe, Jr. et al.

(10) Patent No.: US 9,418,710 B1
(45) Date of Patent: Aug. 16, 2016

(54) NANOPARTICULATE-TRAPPING FILTER FOR HARD DISK DRIVE

(71) Applicant: HGST Netherlands B.V., Amsterdam (NL)

(72) Inventors: Seong-Hun Choe, Jr., Fujisawa (JP); Hiroaki Sudo, Sagamihara (JP); Keio Wakabayashi, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/742,309

(22) Filed: Jun. 17, 2015

(51) Int. Cl.
*G11B 33/14* (2006.01)
*B01D 45/16* (2006.01)
*B01D 53/26* (2006.01)
*B01D 46/00* (2006.01)
*B01D 46/54* (2006.01)
*B01D 53/32* (2006.01)
*B01D 53/22* (2006.01)

(52) U.S. Cl.
CPC .............. *G11B 33/146* (2013.01); *B01D 45/16* (2013.01); *B01D 46/0036* (2013.01); *B01D 46/543* (2013.01); *B01D 53/22* (2013.01); *B01D 53/261* (2013.01); *B01D 53/323* (2013.01); *B01D 2053/221* (2013.01)

(58) Field of Classification Search
CPC .. B01D 50/002; B01D 45/12; B01D 46/0068; B01D 45/16; B01D 50/004; B01D 46/0005; B10D 2247/02; B10D 46/2403; B10D 50/00; B04C 9/00; B04C 2009/001; B04C 2009/008; G11B 33/146; G11B 33/1446
USPC ......... 360/97.16–97.18; 55/337, 345; 15/352; 95/34, 269
See application file for complete search history.

(56) References Cited

U.S. PATENT DOCUMENTS 4,363,057 A    12/1982  Siverling et al.
4,845,334 A *   7/1989  Stocks ................... B01D 46/00
                                                219/121.49

(Continued)

FOREIGN PATENT DOCUMENTS

CN      1767046 A      5/2006
WO   WO9904884 A1      2/1999

OTHER PUBLICATIONS

Tae-Sik Kang, Design and Performance Test of Comb-Shaped Clamp/Spacer for Improvement of Recirculation Filter Efficacy in a Hard Disk Drive, IEEE Transactions on Magnetics, Feb. 2009, pp. 201-205, vol. 45, No. 1, IEEE Xplore, downloaded from http://www.researchgate.net/publication/224380229_Design_and_Performance_Test_of_Comb-Shaped_ClampSpacer_for_Improvement_of_Recirculation_Filter_Efficacy_in_a_Hard_Disk_Drive.

(Continued)

*Primary Examiner* — Will J Klimowicz
(74) *Attorney, Agent, or Firm* — John D. Henkhaus

(57) ABSTRACT

A hard disk drive (HDD) filter assembly may include an inlet for receiving an input gas, a cyclonic particle separator configured for separating certain sized particulates from the gas, and a trap chamber for securing the particulates separated from the gas. Such a filter assembly may be designed and configured to separate and secure nanoparticulates from the input gas, such as nanoparticulates with diameters less than around 100 nm. A filter assembly may further include a desiccant chamber for controlling the humidity of the cleaned gas and a membrane for absorbing and/or adsorbing some remaining particulates from the gas before the gas enters the main chamber of the HDD.

19 Claims, 5 Drawing Sheets

(56) References Cited

U.S. PATENT DOCUMENTS

| | | | |
|---|---|---|---|
| 5,158,583 A * | 10/1992 | Bodin | G21F 9/005 299/1.4 |
| 6,238,467 B1 | 5/2001 | Azarian et al. | |
| 6,266,208 B1 | 7/2001 | Voights | |
| 6,395,073 B1 | 5/2002 | Dauber | |
| 6,633,529 B1 | 10/2003 | Yamada et al. | |
| 6,726,745 B2 | 4/2004 | Tuma et al. | |
| 7,166,142 B2 | 1/2007 | Tuma et al. | |
| 7,247,180 B1 * | 7/2007 | Hill | A47L 9/0081 55/315 |
| 7,306,659 B2 | 12/2007 | Gorton et al. | |
| 8,317,901 B2 * | 11/2012 | Kruglick | B01D 47/066 261/3 |
| 2009/0090245 A1 | 4/2009 | Olszewski | |
| 2011/0209611 A1 * | 9/2011 | Kruglick | B01D 47/066 95/64 |
| 2012/0176701 A1 * | 7/2012 | Schreck | G11B 33/148 360/97.22 |
| 2012/0204722 A1 * | 8/2012 | Watkins | B03C 3/017 96/55 |
| 2013/0044393 A1 * | 2/2013 | Brown | H05K 5/0213 360/97.16 |
| 2014/0144319 A1 * | 5/2014 | Paoluccio | B01D 45/16 95/78 |
| 2014/0260211 A1 * | 9/2014 | Patchett | F01N 3/021 60/297 |

OTHER PUBLICATIONS

Clarage, Multi-Cyclone Dust Collectors, Jun. 2003, 8 pages, Minneapolis, MN, downloaded from http://www.clarage.com/docs/catalogs/clarage-dust-collectors.pdf?sfvrsn=2.

W. L. Gore & Associates, Inc., Disk Drive Filters: GORE Electrostatic Recirculation, Published 2006, 1 page, downloaded from: http://www.gore.com/en_xx/products/filtration/diskdrive/particle/electrostatic_recirculation.html.

W. L. Gore & Associates, Inc., Disk Drive Filters: GORE Adsorbent Box, Published 2006, 2 pages, downloaded from: http://www.gore.com/en_xx/products/filtration/diskdrive/adsorbent/adsorbent_box.html.

* cited by examiner

NANOPARTICULATE-TRAPPING FILTER FOR HARD DISK DRIVE

FIELD OF EMBODIMENTS

Embodiments of the invention may relate generally to hard disk drives and more particularly to a filter that traps and holds nanoparticulates.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, because the density of helium is one-seventh that of air. For example, operating an HDD in helium reduces the drag force acting on the spinning disk stack and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDDs is also increased due to low humidity, less sensitivity to altitude and external pressure variations, and the absence of corrosive gases or contaminants.

However, challenges remain in the manufacturing of helium-filled, sealed HDDs. For example, nanoparticulate contaminants may be introduced into an HDD during helium injection and/or humidity control processes. Further, nanoparticulates may be so small that they pass through conventional filters, such as those utilizing porous and/or microporous polytetrafluoroethylene (PTFE) membranes.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed toward a hard disk drive (HDD) filter assembly, a hard disk drive comprising such a filter assembly, and a method for filling a hard disk drive with a cleaned lighter-than-air gas, which may utilize such a filter assembly. An HDD filter assembly may include an inlet for receiving an input gas, a cyclonic particle separator for separating particulates from the gas, and a trap chamber for securing the particulates separated from the gas. Such a filter assembly may be designed and configured to separate and secure nanoparticulates from the input gas, such as nanoparticulates with diameters less than around 100 nm.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a hard disk drive filter assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of filling a hard disk drive with a cleaned lighter-than-air gas. Thus, in accordance with an embodiment, a plan view illustrating an HDD 100 is shown in FIG. 1 to illustrate an exemplary operating environment.

Figure 1:
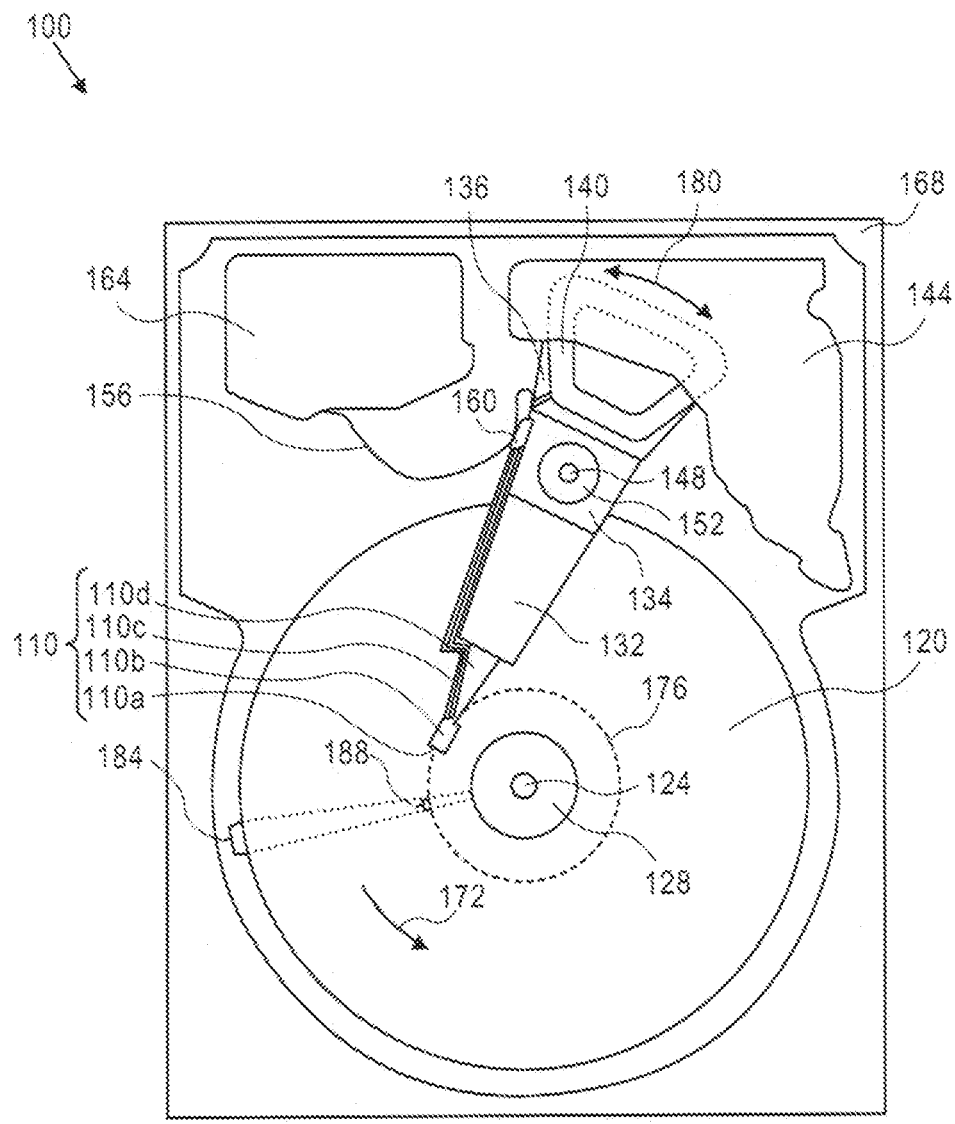
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE module 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, HDDs are being manufactured which are hermetically sealed with helium inside, and that nanoparticulate contaminants introduced into an HDD may be so small that they pass through conventional absorbent/adsorbent breather filters ("AB filters"). For a non-limiting example, it has been found that one cause of nanoparticulate contamination may be attributed to production of aluminum nanoparticulates during an HDD laser welding process, and that one way in which such nanoparticulates are introduced into an HDD is by way of helium injection and dry-air (i.e., humidity control) injection processes. Furthermore, such nanoparticulates may pass through a conventional AB filter that utilizes a PTFE membrane because such a membrane is made with fine fibers, which means there are inherently small holes or gaps between and among such fibers.

One approach to the foregoing challenge is to adopt a filter membrane that has finer gaps between the fibers. However, such an approach would likely result in a more costly AB filter, which is undesirable. Furthermore, such an approach would likely result in the pressure drop across the filter increasing, thereby increasing the take time due to slow gas flow through the AB filter during the injection process(es). Thus, such an approach lacks merit.

Nanoparticulate-Trapping Filter Functionality

Figure 2:
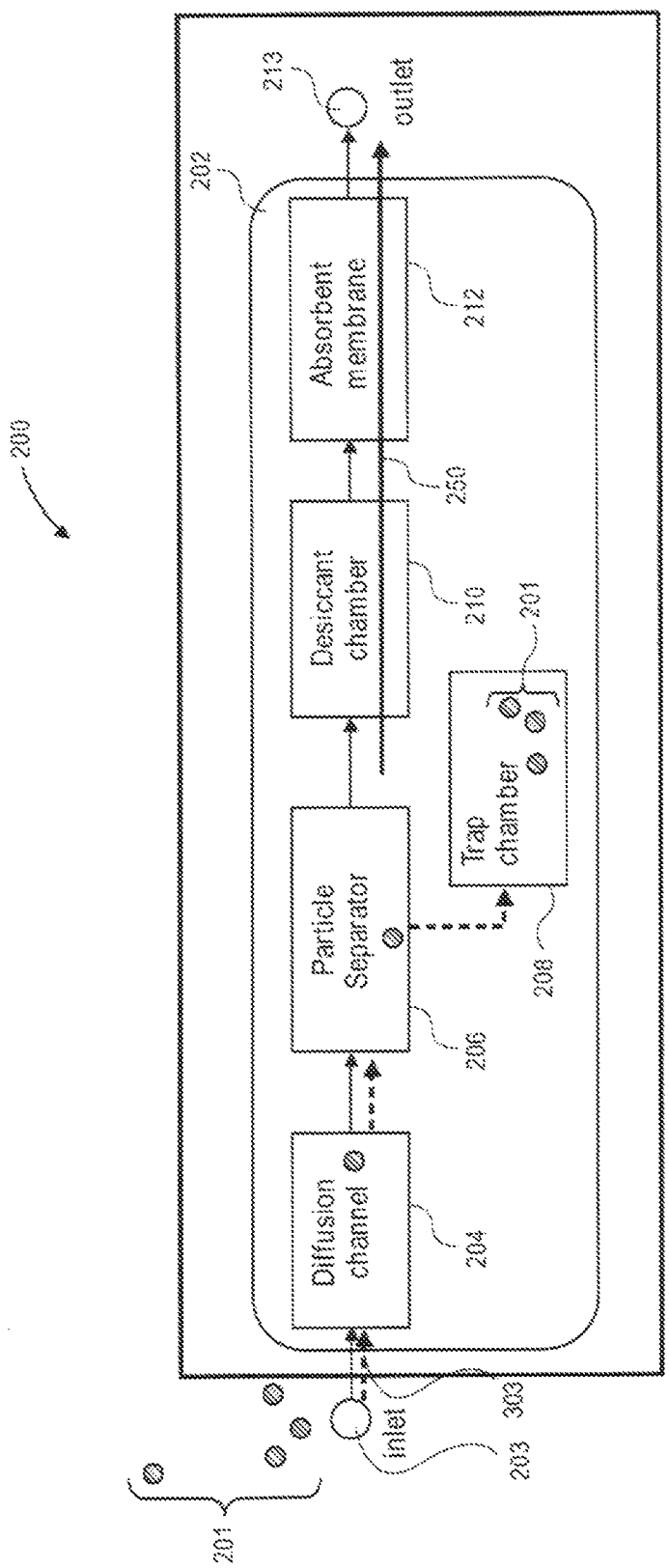
FIG. 2 is a diagram illustrating a nanoparticulate-trapping filter, according to an embodiment.

FIG. 2 is a diagram illustrating a nanoparticulate-trapping filter, according to an embodiment. HDD 200 comprises a nanoparticulate-trapping filter 202 comprising a filter inlet 303, which mates with an HDD inlet 203, and a filter outlet 213, with a particle separator 206 and a trap chamber 208 therebetween. Breather and/or other HDD filters often are designed and configured to serve multiple functions, such as absorbing contaminants, adsorbing contaminants, controlling humidity, and the like. Further, the different functions may apply to contaminants generally and/or to specific types of contaminants, such as hydrocarbons, acids, etc. Filter 202 may be implemented as an absorbent/adsorbent filter, which is explained in more detail herein. The term absorbent/adsorbent filter is used generally to refer to a filter that includes an absorbent, an adsorbent, or both an absorbent and an adsorbent, which may vary from implementation to implementation.

A filter such as filter 202 is typically positioned on the inside of an HDD such as HDD 200, preferably with a diffusion channel downstream of the outside environment. FIG. 2 further illustrates nanoparticulates 201 outside of and within the filter 202. For a non-limiting example, a nanoparticulate may be considered a nano-sized particulate in the range of around 10 nm to 1000 nm in diameter, where a typical size may be less than around 100 nm in diameter, for example.

Filter 202 comprises an optional diffusion channel 204, a particle separator 206 and a trap chamber 208, generally with the structure for and purpose of separating and trapping nanoparticulates 201 before they are able to reach an optional desiccant chamber 210 and on to an optional absorbent membrane 212 (and/or an adsorbent membrane). As depicted, nanoparticulates 201 enter the HDD 200 via the HDD inlet 203, such as a gas inlet for injecting helium or another lighter-than-air gas and/or dry air, for example, into the HDD 200. The nanoparticulates 201 may travel through the diffusion channel 204 (if present), which generally serves to reduce the amount of hydrocarbons, water vapor, and acid gases entering the HDD 200 from the outside environment, thereby extending the life of the absorbent/adsorbent membrane.

After travelling through the diffusion channel 204 (if present) the nanoparticulates 201 enter the particle separator 206, where the nanoparticulates 201 are separated from the gas incoming through the HDD inlet 203 and filter inlet 303. According to an embodiment, the particle separator 206 is configured as a cyclone-structured separator, whereby the nanoparticulates injected into the cyclone particle separator 206 lose their kinetic energy by colliding with the walls of the conical cyclone structure, and thereby fall down through a cyclone outlet.

Cyclonic separation refers to a particle separation process that utilizes vortex separation, whereby a rotating gas flow is established within a cylindrical or conical structure referred to as a cyclone. Air flows in a helical pattern before exiting the cyclone through the center of the cyclone and out the top. Larger particles in the rotating stream have too much inertia to follow the tight curve of the stream and strike the outside wall, eventually falling to the bottom of the cyclone. As the rotating flow moves towards the narrow end of a conical cyclone the rotational radius of the stream is reduced and, therefore, increasingly smaller particles may be separated. Generally, the cyclone geometry and the flow rate control the size of particle that will be removed from the stream.

Once the nanoparticulates 201 are separated from the incoming gas via the particle separator 206, the nanoparticulates 201 fall down into the trap chamber 208 where the nanoparticulates 201 are trapped or held, by an electrostatic material for example. The clean gas 250, absent the nanoparticulates 201, is able to migrate out of the particle separator 206 and into the desiccant chamber 210 (if present) to control the humidity of the clean gas 250, i.e., by inducing or sustaining a state of desiccation or dryness. From the desiccant chamber 210 the clean air may then move on to the absorbent membrane 212 (if present), whereby remaining particulates may be absorbed (or adsorbed, whichever may be the case).

Nanoparticulate-Trapping Filter Structure

Figure 3B:
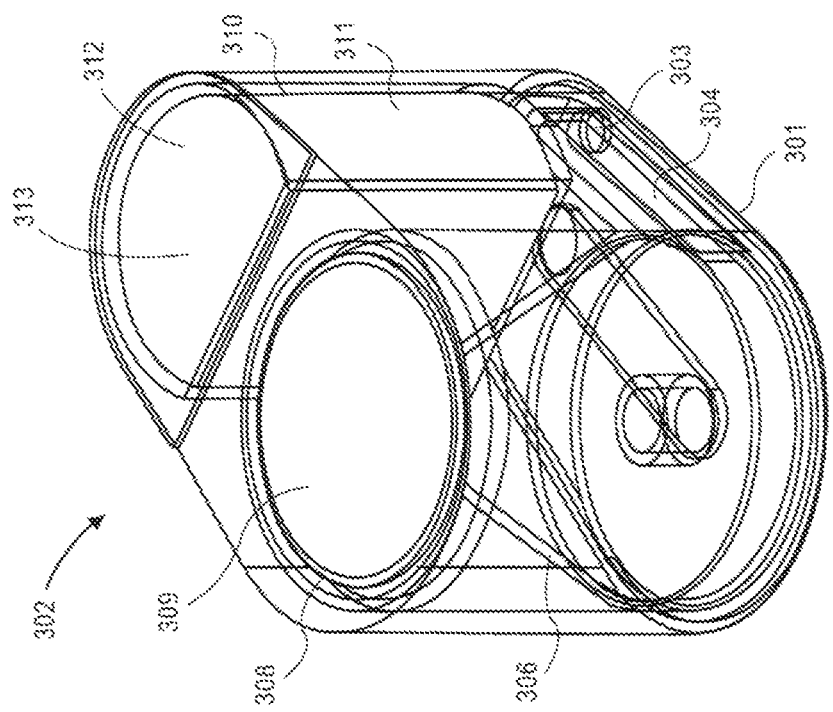
FIG. 3B is a bottom perspective view illustrating the nanoparticulate-trapping filter of FIG. 3A, according to an embodiment.
Figure 3A:
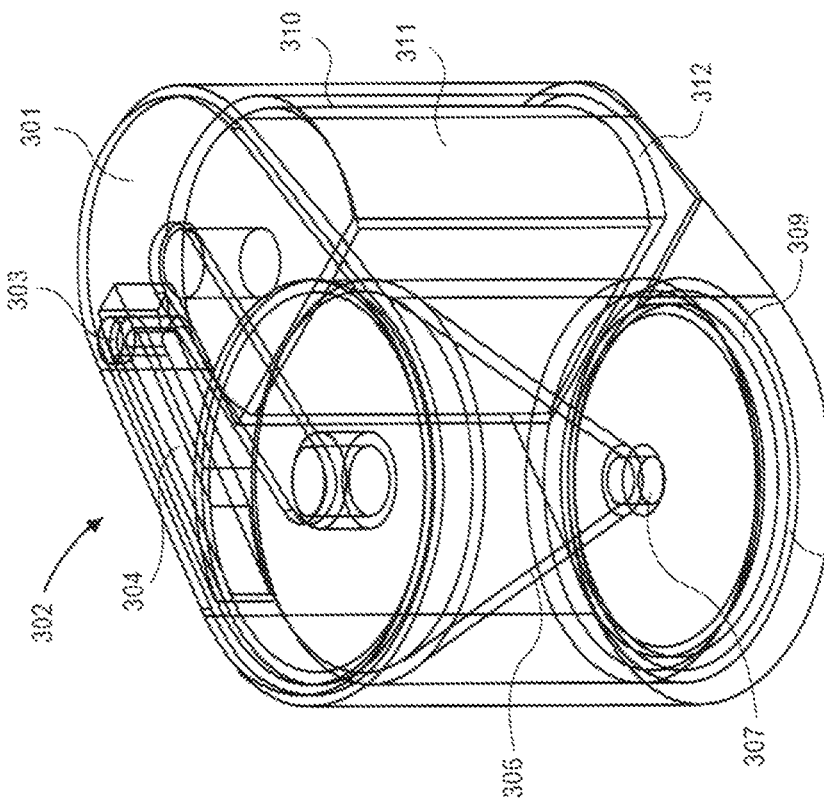
FIG. 3A is a top perspective view illustrating a nanoparticulate-trapping filter, according to an embodiment.

FIG. 3A is a top perspective view illustrating a nanoparticulate-trapping filter and FIG. 3B is a bottom perspective view illustrating the nanoparticulate-trapping filter of FIG. 3A, both according to an embodiment.

Filter 302 (also referred to as a "filter assembly") comprises a filter inlet 303 which, when the filter 302 is installed into a hard disk drive such as HDD 200 (FIG. 2), mates with the HDD inlet 203 (FIG. 2). Filter 302 may comprise a diffusion channel 304 having the same or similar functionality as the diffusion channel 204 (FIG. 2), according to an embodiment. Filter 302 comprises a cyclonic particle separator 306 having the same or similar functionality as the particle separator 206 (FIG. 2), and a trap chamber 308 having the same or similar functionality as the trap chamber 208 (FIG. 2), according to an embodiment. Trap chamber 308 is configured with a trapping material 309 for trapping or holding secure the nanoparticulates, according to an embodiment. According to a related embodiment, the trapping material 309 is an electrostatic material.

Similarly to as described in reference to FIG. 2, nanoparticulates enter the filter 302 entrained in a gas injected via the filter inlet 303 and HDD inlet 203 (FIG. 2). The nanoparticulates may travel through the diffusion channel 304 (if present), which generally serves to reduce the amount of certain materials entering from the outside environment. After travelling through the diffusion channel 304 (if present) the nanoparticulates enter the cyclonic particle separator 306, where the nanoparticulates are separated from the gas by way of losing their kinetic energy by colliding with the walls of the conical cyclone structure. Once separated, the nanoparticulates fall down through a cyclone outlet 307 into the trap chamber 308, where the nanoparticulates are trapped, held, secured by the trapping material 309. According to an embodiment, the trapping material 309 comprises an electrostatic material for securing the unwanted nanoparticulates.

According to an embodiment, the clean gas (such as clean gas 250 of FIG. 2), absent the nanoparticulates, is allowed to migrate out of the particle separator 306 and into a desiccant chamber 310 (having the same or similar functionality as the desiccant chamber 210 of FIG. 2) to control the humidity of the clean gas, e.g., to reduce the humidity of, i.e., to dry, the clean gas. According to an embodiment, from the desiccant chamber 310 the dried clean air may then move on through an absorbent membrane 312 (or adsorbent membrane) (having the same or similar functionality as the absorbent membrane 212 of FIG. 2), whereby remaining particulates may be absorbed (or adsorbed, whichever may be the case), before exiting the filter 302 via an outlet 313 (having the same or similar functionality as the outlet 213 of FIG. 2). Once the dried clean air exits through the outlet 313 it enters the main volume of the HDD.

Figure 4:
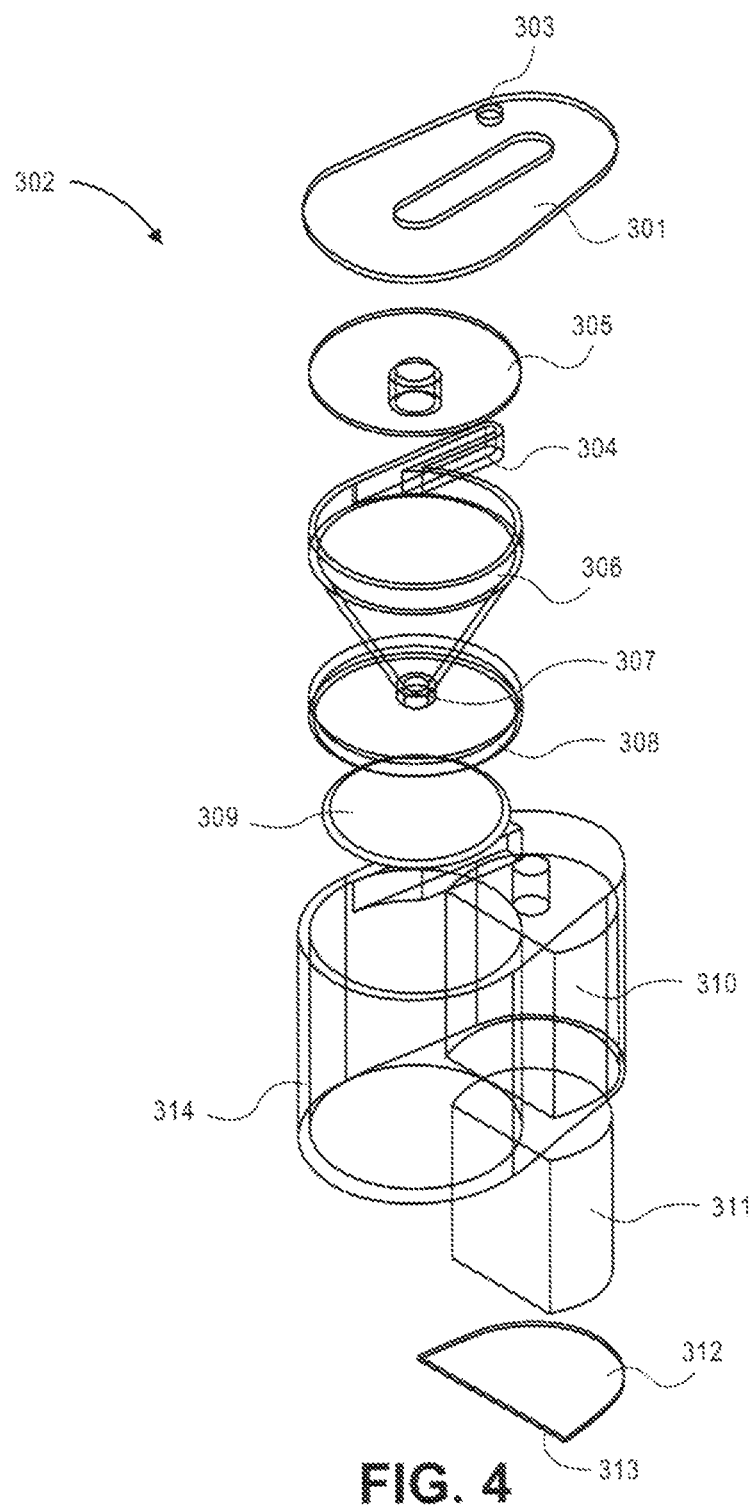
FIG. 4 is an exploded view illustrating the nanoparticulate-trapping filter of FIG. 3A, according to an embodiment.

FIG. 4 is an exploded view illustrating the nanoparticulate-trapping filter of FIG. 3A, according to an embodiment.

As described in reference to FIGS. 3A, 3B, filter 302 comprises a filter inlet 303 which, when the filter 302 is installed into a hard disk drive such as HDD 200 (FIG. 2), mates with the HDD inlet 203 (FIG. 2). The filter inlet 303 is constituent to a lid 301, which may have an adhesive tape corresponding therewith, for securing filter 302 to an inside wall, cover, or base of an HDD.

Filter 302 may comprise a diffusion channel 304 having the same or similar functionality as the diffusion channel 204 (FIG. 2), according to an embodiment. Filter 302 comprises the cyclonic particle separator 306 having the same or similar functionality as the particle separator 206 (FIG. 2). According to an embodiment, filter 302 also comprises a cap 305 for the cyclonic particle separator 306, where the cap 305 is configured with a hole or port through which cleaned gas (e.g., free of the entrained nanoparticulates separated from the gas in the cyclonic particle separator 306) may pass for migration onward and out of the cyclonic particle separator 306, while the separated nanoparticulates pass through the cyclone outlet 307.

Filter 302 comprises the trap chamber 308 having the same or similar functionality as the trap chamber 208 (FIG. 2), according to an embodiment. According to an embodiment, the trap chamber 308 contains trapping material 309 for trapping or holding secure the nanoparticulates. According to a related embodiment, the trapping material 309 is an electrostatic material.

According to an embodiment, the clean gas (such as clean gas 250 of FIG. 2), absent the nanoparticulates, is allowed to migrate out of the particle separator 306 via the port of cap 305, and into the desiccant chamber 310. Desiccant chamber 310 contains a desiccant 311 for controlling the humidity of the clean gas, e.g., to reduce the humidity of or dry out the clean gas. According to an embodiment, from the desiccant chamber 310 the dried clean air may then move on through an absorbent membrane 312 (or adsorbent membrane), such as a PTFE (polytetrafluoroethylene) membrane, whereby some remaining undesirable particulates may be absorbed (or adsorbed, whichever may be the case), before exiting the filter 302 via the outlet 313. Once the dried clean air exits through the outlet 313 it enters the main volume of the HDD.

Filter 302 comprises a filter housing 314 configured for housing the foregoing components of the filter 302, such as the cyclonic particle separator 306 and its associated components and the trap chamber 308 and its associated components, and, according to various embodiments, further housing the desiccant chamber 310 and its associated components, etc. The filter housing 314 is configured to mate with the lid 301 to form an enclosed or semi-enclosed structure for the filter assembly.

Process for Filling an HDD with a Cleaned Lighter-than-Air Gas

Figure 5:
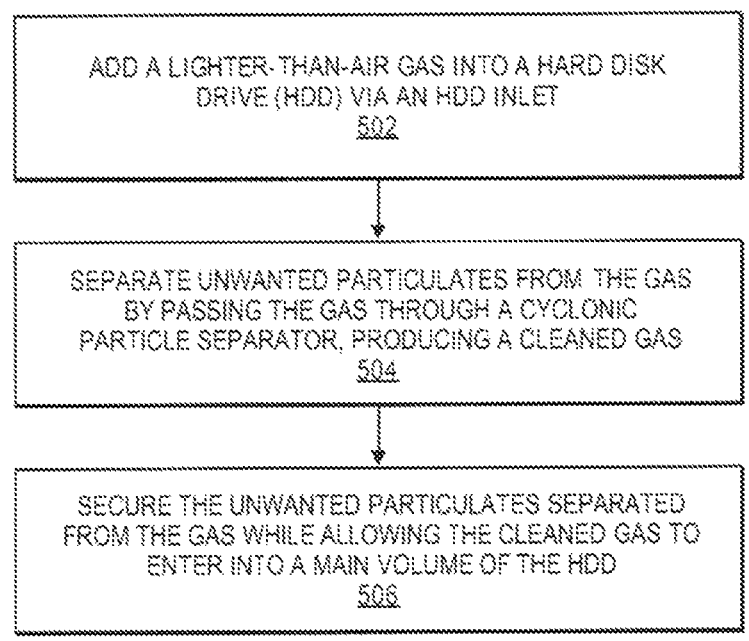
FIG. 5 is a flow diagram illustrating a method for filling a hard disk drive (HDD) with a cleaned lighter-than-air gas, according to an embodiment.

FIG. 5 is a flow diagram illustrating a method for filling a hard disk drive (HDD) with a cleaned lighter-than-air gas, according to an embodiment.

At block 502, a lighter-than-air gas is added into a hard disk drive via an HDD inlet. For example, helium is added into HDD 200 (FIG. 2) via HDD inlet 203. The manner in which the lighter-than-air gas is added to an HDD may vary from implementation to implementation. For example, a pressurized gas may be injected directly into an HDD via an inlet, or an HDD may be placed in a pressurized gas environment in which the pressurized gas transfers into the HDD over a period of time, or the like.

At block 504, unwanted particulates are separated from the gas by passing the gas through a cyclonic particle separator, thereby producing a cleaned gas. For example, the gas enters a filter such as filter 302 (FIGS. 3A, 3B) via filter inlet 303 (FIGS. 3A, 3B), and flows into the cyclonic particle separator 306 (FIGS. 3A, 3B), whereby a certain size of unwanted particulates (e.g., nanoparticulates 201 of FIG. 2, such as aluminum nanoparticles) fall through the cyclone outlet 307 (FIGS. 3A, 3B). Recall that the cyclone geometry and the gas flow rate determine what size of particle will separate from the gas flow by way of the cyclonic particle separator 306.

At block 506, the particulates that are separated from the gas flow (at block 504) are secured, while the cleaned gas is allowed to enter into a main volume of the HDD. For example, the nanoparticulates 201 (FIG. 2) that are separated from the gas flow by way of the cyclonic particle separator 306 (FIGS. 3A, 3B) fall down into the trap chamber 308 (FIGS. 3A, 3B) by way of gravity, whereby they are secured, held, trapped within the trap chamber 308, such as by a trapping material 309 (FIGS. 3A, 3B). According to an embodiment, the trapping material 309 is an electrostatic material, for example an electret. Ultimately, the cleaned gas exits the filter 302 by way of filter outlet 313 and enters into the main volume of the HDD. Furthermore, embodiments described herein are not expected to have much impact on the pressure loss between the filter inlet (e.g., filter inlet 303) and the filter outlet (e.g., outlet 313). Therefore, the take time of the HDD gas injection process is largely unaffected by use of such embodiments.

Of course, use of embodiments such as those illustrated and described in reference to FIGS. 3A, 3B may further include passing the cleaned gas through a desiccant chamber (e.g., desiccant chamber 310) containing a desiccant (e.g., desiccant 311) to control the humidity of the cleaned gas, thereby producing a dried cleaned gas. Furthermore, the dried cleaned gas may be passed to a membrane (e.g., membrane 312) configured for absorbing and/or adsorbing some remaining particulates from the dried clean gas.

Parameters that will contribute to dictating the performance of embodiments, and thus which may be considered in the design of such a filter assembly, include the pressure and flow rate of the incoming gas and the particle size distribution which should be separated.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive filter assembly sized to fit within a hard disk drive, the filter assembly comprising:
   an inlet configured to mate with a hard disk drive inlet and for receiving an input gas;
   a cyclonic particle separator configured for separating solid particulates from said gas that enters said cyclonic particle separator;
   a trap chamber configured for securing separated particulates;
   a desiccant chamber into which said gas flows after flowing through said cyclonic particle separator, wherein said desiccant chamber contains a desiccant for controlling the humidity of said gas;
   a membrane configured for absorbing and/or adsorbing remaining particulates from said gas;
   a housing in which said cyclonic particle separator, said trap chamber, said desiccant chamber and said membrane are housed; and
   an outlet through which said gas exits said filter assembly.

2. The filter assembly of claim 1, wherein a geometry and a flow rate associated with said cyclonic particle separator are configured to separate said particulates that are nanoparticulates with diameters less than around 100 nm.

3. The filter assembly of claim 2, wherein said nanoparticulates are aluminum nanoparticulates.

4. The filter assembly of claim 1, further comprising:
   a diffusion channel between said inlet and said cyclonic particle separator and configured for reducing the amount of unwanted materials entering said particle separator.

5. The filter assembly of claim 1, wherein said trap chamber contains an electrostatic material for securing said solid particulates separated from said gas.

6. A hard disk drive comprising:
   a recording disk medium rotatably mounted on a spindle;
   a read-write head slider comprising a read-write transducer configured to read from and to write to said disk medium;
   a voice coil actuator configured to move said head slider to access portions of said disk medium;
   a hard disk drive inlet through which a gas can be injected into said hard disk drive; and
   a filter assembly comprising:
      a filter inlet for receiving a gas injected into said hard disk drive via said hard disk drive inlet,
      a cyclonic particle separator configured for separating solid particulates from said gas that enters said cyclonic particle separator, and
      a trap chamber configured for securing separated solid particulates.

7. The hard disk drive of claim 6, wherein said cyclonic particle separator of said filter assembly is configured having a geometry and a flow rate for separating nanoparticulates with diameters less than around 100 nm.

8. The hard disk drive of claim 7, wherein said nanoparticulates are aluminum nanoparticulates.

9. The hard disk drive of claim 6,
   wherein said filter assembly further comprises:
      a diffusion channel between said filter inlet and said cyclonic particle separator and configured for reducing the amount of unwanted materials entering said particle separator,
      a desiccant chamber into which said gas flows after flowing through said cyclonic particle separator, said desiccant chamber containing a desiccant for controlling the humidity of said gas,
      a membrane configured for absorbing and/or adsorbing some remaining particulates from said gas, and
      an outlet through which said gas exits said filter assembly into a main volume of said hard disk drive.

10. The hard disk drive of claim 6, wherein said trap chamber of said filter assembly contains an electrostatic material for securing said solid particulates separated from said gas.

11. The hard disk drive of claim 6, filled with a substantially helium gas.

12. The hard disk drive of claim 6, filled with a lighter-than-air gas.

13. The hard disk drive of claim 6, filled with dry air.

14. A method for filling a hard disk drive (HDD) with a cleaned lighter-than-air gas, said HDD having a main volume, the method comprising:
   adding said lighter-than-air gas into said HDD via an HDD inlet;
   separating unwanted solid particulates from said gas by passing said gas through a cyclonic particle separator positioned in said HDD, producing a cleaned gas;
   securing said unwanted solid particulates separated from said gas; and
   allowing said cleaned gas to enter into said main volume of said HDD.

15. The method of claim 14, wherein separating said unwanted particulates from said gas includes separating nanoparticulates with diameters less than around 100 nm from said gas.

16. The method of claim 15, wherein separating said nanoparticulates from said gas includes separating aluminum nanoparticulates from said gas.

17. The method of claim 14, wherein allowing said cleaned gas to enter into said main volume of said HDD comprises:
   passing said cleaned gas through a desiccant chamber containing a desiccant for controlling the humidity of said cleaned gas, producing a dried cleaned gas, and
   passing said dried cleaned gas to a membrane configured for absorbing and/or adsorbing some remaining particulates from said dried cleaned gas.

18. The method of claim 14, wherein securing said unwanted particulates separated from said gas includes securing said particulates with an electrostatic material.

19. The method of claim 14, wherein adding said lighter-than-air gas into said HDD includes adding a substantially helium gas into said HDD.

* * * * *